United States Patent [19]

Totty et al.

[11] 4,157,994

[45] Jun. 12, 1979

[54] LOW TEMPERATURE BAKE WATER REDUCIBLE ACRYLIC ENAMEL

[75] Inventors: Stuart M. Totty, Maumee; James A. Meier, Waterville, both of Ohio

[73] Assignee: Inmont Corporation, Clifton, N.J.

[21] Appl. No.: 833,770

[22] Filed: Sep. 16, 1977

[51] Int. Cl.$^2$ .............................................. C08L 61/20
[52] U.S. Cl. .............................. 260/29.4 UA; 260/856
[58] Field of Search ............ 260/29.4 UA, 856, 42.48, 260/42.54, 33.4 R, 33.2 R, 32.8 R

[56] References Cited

U.S. PATENT DOCUMENTS

| | | | |
|---|---|---|---|
| 3,245,932 | 4/1966 | Glavis et al. | 260/29.4 UA |
| 3,857,511 | 12/1974 | Govindan | 260/29.4 UA |

*Primary Examiner*—J. Ziegler

*Attorney, Agent, or Firm*—Harness, Dickey & Pierce

[57] ABSTRACT

A water-reducible acrylic enamel coating composition capable of being substantially completely cured at a relatively low temperature, such as about 250° F. and containing a water-miscible partially etherified melamine formaldehyde cross-linking agent and an acrylic copolymerization product of about 3% to about 8% of an unsaturated carboxylic acid, about 10% to 30% of a hydroxy functional monomer and about 62% to 87% of a nonfunctional monomer. The acrylic copolymer is further characterized as having a glass transition temperature of about −10° C. to 45° C. and a molecular weight of about 2,000 to about 100,000. The aminoplast resin preferably is only partially etherified and contains about 10% to about 30% by weight reactive methylol groups.

9 Claims, No Drawings

LOW TEMPERATURE BAKE WATER REDUCIBLE ACRYLIC ENAMEL

BACKGROUND OF THE INVENTION

The present invention is particularly applicable but not necessarily limited to coating compositions for use as decorative finish or top coats for automobile vehicle bodies. Organic solvent-based acrylic-melamine enamels have heretofore been in widespread use in the automotive industry in a variety of decorative colors as finish coats for automobiles. Such acrylic enamels typically contain an acrylic resin containing about 15% to 20% of a hydroxy functional monomer, about 1% to 2% of an acid such as methacrylic acid, and the balance nonfunctional monomers. Acrylic resins of the foregoing type typically have a glass transition temperature ($T_g$) of about 20° C. to 80° C. The acrylic copolymer is formulated with about 20 to about 30% of an aminoplast cross-linking agent such as butylated melamine, whereby the cross-linking reaction occurs between the acrylic hydroxyol and the melamine cross-linking resin component catalyzed by a small amount of the organic acid in the polymer chain. Typically, the curing of such coating compositions is effected at temperatures of from about 250° F. to about 300° F. for a period of from 20 to about 30 minutes.

Because of environmental considerations, organic solvent reducible acrylic enamels of the foregoing type have been superseded in certain situations by water reducible acrylic anamels. Further impetus to the use of water reducible acrylic enamels has been provided by environmental protection laws such as County Rule 66, enacted by the County of Los Angeles, which, inter alia, provides a control of the effluents evolved during the oven curing of various coating compositions. In order to reduce the quantity of such emissions into the atmosphere, the effluent from such curing ovens must be incinerated, such as employing an "after burner" in the exhaust stack. Los Angeles County Rule 66 provides an exception under paragraph i-5 thereof, which exempts from the foregoing provision, coating formulations in which the total volatile portion is comprised of at least 80% water by volume with the balance comprising nonphotochemically reactive organic solvents.

Because of the foregoing and other considerations, conventional organic solvent reducible acrylic enamels have been modified to render them water reducible, enabling coating formulations to be prepared containing less than about 20% organic solvent. Typically, this has been achieved in accordance with prior art practices by increasing the acid content of the acrylic copolymer from the former level of about 1% to 2% to as high as 8% to 18% and by neutralizing the carboxyl groups with ammonia or alkyl amines to form ionic species whereby the normally hydrophobic acrylic copolymer is rendered sufficiently hydrophilic to enable reduction with water. Aminoplast resins, such as alkoxy methyl melamines, are employed to effect a cross-linking reaction during the oven curing cycle, which is normally further catalyzed by the presence of strong acids. It has been found, in accordance with such prior art formulations, that temperatures of at least about 300° F. to as high as 350° F. must be employed to obtain a sufficient degree of reaction with the carboxyl functionality of the copolymer to provide a resultant cured coating which is substantially completely cured as evidenced by its resistance to water and organic solvents. The high percentage of acid content of such acrylic copolymers has frustrated prior art attempts to effect a satisfactory cure of such water-reducible acrylic enamels at temperatures below about 300° F. due to the sensitivity of the ostensibly cured coating to moisture, such as encountered during exposure of the coating to moist ambient environments, and particularly ocean and seaside atmospheres. The sensitivity of such coatings to moisture results in chemical conversion thereof which is usually evidenced by a loss of gloss or serious staining and blotching of the surface finish. In spite of the energy crisis and the desire to conserve fuel by utilizing lower bake temperatures, it has been found commercially expedient to effect a curing of such prior art coating formulations at temperatures of about 325° F. for periods of about 30 minutes in order to produce a final coating which is moisture and organic solvent resistant.

The problems and disadvantages associated with prior art water-reducible acrylic enamel coating formulations are overcome in accordance with the present invention whereby a water-reducible formulation is provided incorporating controlled amounts of an aminoplast cross-linking agent and an acrylic copolymer of a carefully controlled composition and functionality enabling a substantially complete curing of the coating at temperatures as low as about 250° F. within the same normal curing period, whereby a substantial reduction in the amount of energy necessary to effect a cure is effected, providing further economies in the manufacture of automobiles and a conservation of energy.

SUMMARY OF THE INVENTION

The benefits and advantages of the present invention are achieved by a water-reducible acrylic enamel coating composition incorporating carefully controlled and selected types and amounts of an aminoplast cross-linking agent and an acrylic copolymer which is capable of being substantially completely cured at comparatively low bake temperatures of about 250° F. More specifically, the coating composition comprises a vehicle composed of a binder and a solvent consisting of water and a relatively low percent of a water-miscible organic solvent in further combination with a suitable pigment, if desired, present in an amount up to about 50% of the total nonvolatile content of the coating composition. The nonvolatile binder constituent of the vehicle is comprised of an aminoplast resin, and more specifically, an alkoxy methyl melamine resin containing at least about 10% up to about 30% methylol groups, and preferably, from about 12% to about 25% by weight methylol groups based on the nonvolatile content of the aminoplast resin. The aminoplast resin is employed in an amount of from about 20% to about 50% of the nonvolatile binder constituent in combination with from about 50% to about 80% by weight of an acrylic copolymer having a molecular weight of about 2,000 to about 100,000 and a Tg of about $-10°$ C. up to about 45° C. The acrylic copolymer is further characterized as containing from about 3% up to about 8% by weight of an $\alpha, \beta$ unsaturated carboxylic acid; of a specific class such as acrylic acid, for example; about 10% to about 30% by weight of a hydroxy functional monomer of selected specific types such as hydroxy ethyl acrylate, and about 62% to about 80% by weight of a nonfunctional monomer, such as acrylonitrile, styrene, $C_1$ to $C_{12}$ alkyl acrylates, $C_1$ to $C_{12}$ alkyl methacrylates or the like. The acrylic copolymer is rendered hydrophilic, imparting water reducibility to the coating composition by neutralization at a pH of from about 7 up to about 12 with ammonia or an organic amine of a type which is adapted to dissociate, rendering the carboxyl groups active upon heating of the coating composition to about 250° F. during the curing cycle.

The solvent constituent of the coating composition contains from about 4% up to 20% by volume of a water-miscible organic solvent of a type which is photochemically nonreactive in combination with water. The quantity of solvent employed can be varied to attain the desired viscosity of the liquid coating composition consistent with the particular manner by which it is to be applied to the substrate, such as by brushing, flooding, spraying, or the like.

It will be apparent from the foregoing that the unique combination of the water-miscible aminoplast cross-linking agent in combination with the hydrophilic acrylic copolymer of controlled carboxyl and hydroxyl content provides for a water-reducible acrylic enamel which can be satisfactorily employed in compliance with environmental protection laws and which can be satisfactorily cured at temperatures substantially below those heretofore required, providing for a substantial savings in energy.

Additional benefits and advantages of the present invention will become apparent upon a reading of the description of the preferred embodiments taken in conjunction with the accompanying examples.

DESCRIPTION OF THE PREFERRED EMBODIMENTS

The low temperature bake water-reducible acrylic enamel coating composition of the present invention comprises a substantially uniform mixture or dispersion of a vehicle comprising a nonvolatile binder and a solvent comprising a mixture of water and a miscible organic solvent in further combination with a suitable pigment. The nonvolatile binder constituent of the vehicle is comprised of from about 20% to about 50% by weight and preferably, from about 25% to about 40% of a water-miscible melamine resin containing at least about 10% up to about 30%, and preferably from about 12% to about 25% by weight methylol groups based on the nonvolatile portion of the melamine resin. The balance of the nonvolatile binder comprises from about 50% to about 80% by weight, and preferably from about 60% to about 75% by weight of an acrylic copolymer characterized as having a Tg of about $-10°$ C. up to about 45° C., and a molecular weight ranging from about 2,000 up to about 100,000. The acrylic copolymer is derived from a copolymerization of a selected unsaturated acid, a hydroxy functional monomer and a nonfunctional monomer to provide a controlled acid content and hydroxyl content of the copolymer.

More specifically, the aminoplast resin is selected from water-reducible melamine resins prepared by reacting melamine with formaldehyde to yield methylol melamines. The resultant methylol groups ($-NCH_2OH$) are subsequently etherified with an alcohol to yield alkoxy methyl groups ($-NCH_2OR$). Of the various alcohols that can be employed for the etherification reaction, methyl alcohol is usually preferred which produces methoxy methyl groups ($-NCH_2OCH_3$). In addition to methyl alcohol, other $C_2$ to $C_4$ alkyl alcohols can be employed, namely: ethanol, propanol and butanol. In either event, the etherification reaction of the methylol groups of the melamine is performed so as to provide at least about 10% up to about 30% unetherified methylol groups and preferably, from about 12% to about 25% by weight of the nonvolatile melamine resin constituent. A careful control of the degree of etherification enables the coating composition to cure, employing only mildly acidic conditions which are provided by the carboxyl acid groups present in the acrylic polymer chain.

The term "water-miscible" melamine formaldehyde resin, as used herein, is intended to encompass melamine resins which are completely water soluble, as well as those which are only partially water soluble but which nevertheless are rendered miscible in the water solvent by virtue of the presence of the other binder constituents. In this regard, partially water soluble melamine resins are preferably first admixed in the acrylic polymer solution, and thereafter the resultant polymer blend is reduced with water.

As used herein, "methylol content" is determined by the difference in foil solids or nonvolatile content resulting from a heating of the polymer solution at 45° C. for a period of 45 minutes to drive off solvent and the nonvolatile content dish solids resulting from a heating of the foil solids at 105° C. for a period of two hours. Generally, this method is reproducible within a range of about plus or minus 2% by weight. The weight loss between foil solids and dish solids results from a decomposition and release of methylol groups.

It will be appreciated that the conditions under which a partial controlled etherification of the methylol melamine resin is performed is also conducive to the condensation and polymerization of the methylol melamine itself, such that the resultant alkoxy methyl melamine resin comprises a complex mixture of monomeric and polymeric species. Such self-polymerization results in a reduction of the net methylol content of the resin and, accordingly, the methylol content of the resin prior to etherification must correspondingly be adjusted to compensate for such a reduction to provide a melamine resin of the desired final methylol content.

The acrylic copolymer comprises the copolymerization product of about 3% to about 8% of an $\alpha, \beta$ unsaturated carboxylic acid selected from the group consisting of acrylic acid, methacrylic acid, and mixtures thereof; about 10% to about 30% by weight of a hydroxy functional monomer selected from the group consisting of a hydroxy $C_2$ to $C_4$ alkyl acrylate, hydroxy $C_2$ to $C_4$ alkyl methacrylate and mixtures thereof and about 62% to about 80% by weight of a nonfunctional monomer selected from the group consisting of acrylonitrile, styrene, $C_1$ to $C_{12}$ alkyl acrylates, $C_1$ to $C_{12}$ alkyl methacrylates and mixtures thereof. The monomeric constituents of the copolymerization product must be carefully controlled within the ranges as specifically set forth and must be of the specific types recited as satisfactory for use in order to achieve a polymer which substantially completely cures through a cross-linking reaction with the aminoplast resin at relatively low baking or curing temperatures of about 250° F. in response to a coreaction between the aminoplastic resin and the hydroxyl groups and some of the carboxyl groups of the resin constituents.

The use of alternative types of carboxylic acids and amounts greater than about 8% results in a copolymer which will not satisfactorily cure at the relatively low bake temperatures required and/or will remain moisture-sensitive due to the hydrophilic character of the carboxyl groups present. On the other hand, the use of unsaturated carboxylic acids in amounts less than about 3% will not provide adequate hydrophilic characteristics to the acrylic copolymer, enabling dispersion thereof in an aqueous organic solvent, and moreover, will not provide sufficient acidity to catalyze the cross-linking curing reaction between the hydroxyl groups and aminoplast resin. The quantity and type of the hydroxy functional monomer is also important in that amounts below about 10% by weight will not provide a coating of satisfactory properties because of insufficient cross-link density as evidenced by poor solvent resistance, while amounts in excess of about 30% results in excessive cross-link density as evidenced by coating brittleness.

In addition to the unsaturated carboxylic acid and hydroxy functional monomer, the acrylic copolymer further contains selected ones of nonfunctional unsaturated monomers ranging from about 62% to about 87% by weight of the copolymer on a nonvolatile basis.

The acrylic copolymer in the coating composition prior to curing is further characterized as having the carboxyl groups thereof neutralized with a solubilizing agent selected from the group consisting of tertiary alkyl amines, tertiary dialkyl hydroxy alkyl amines, tertiary monoalkyl dihydroxy alkyl amines, and mixtures thereof, which form ionic species imparting hydrophilic properties to the acrylic copolymer, enabling dispersion thereof and reduction with water. The neutralization of the carboxyl groups is performed so as to provide an acrylic resin solution having a pH of about 7 up to about 12. The particular type of amine employed for the neutralization of the carboxyl groups is important and is selected so as to provide for a dissociation and liberation of the carboxyl group during the curing cycle when the deposited coating is heated to temperatures approaching the bake temperature of 250° F. In addition to dissociation, the amines volatilize along with the solvent constituents in the coating, rendering the carboxyl groups active for catalyzing the cross-linking reaction. Among the various organic amines suitable for use, the following are particularly preferred: dimethyl ethanol amine, diethyl ethanol amine. Tertiary amines with carbon atom contents above about $C_{10}$ are undesirable due to their relatively low volatility.

In addition to the solvent and nonvolatile binder constituent of the vehicle, the water reducible acrylic enamel coating compositions further may include pigments in amounts conventionally used for automobile finish coats which may range as high as up to about 50% of the total nonvolatile content of the coating composition, and more usually, from about 2% to about 43% by weight of the total nonvolatile content. Typical pigments that can be satisfactorily employed in formulating the acrylic enamel coating composition are pigments such as, for example, phthalocyanine green, phthalocyanine blue, quinacridone pigments, Indanthrene blue, Indo orange and red, benzidine yellow, carbon black, titanium dioxide, iron oxides, cadmium red, Beta Oxy Naphthoic Acid B.O.N. red pigments, lead chromate, molybdate orange, metal flake, etc. Small amounts of conventional additives, such as surfactants, biocides, etc., also may be incorporated in the coating in accordance with known paint technology practices.

The solvent portion of the coating composition, in order to comply with governmental environmental regulations, such as Los Angeles County Rule 66, exception subparagraph i-5, contains at least about 80% by volume water in combination with from about 4% up to about 20% by volume of an organic water-miscible solvent which is photochemically nonreactive. Organic solvents for this purpose which can be satisfactorily employed include $C_1$-$C_8$ alkanols, $C_2$-$C_4$ glycol mono- and di-ethers of $C_1$-$C_4$ alcohols, $C_2$-$C_5$ n-ketones, $C_2$-$C_4$ diglycol mono ethers of $C_1$-$C_4$ alcohols, and mixtures thereof. The quantity of solvent employed will vary in accordance with the intended method of application of the coating formulation to a substrate. Conventionally, in automotive vehicle coating practices, the liquid coating composition is reduced to a viscosity suitable for spray application. In accordance with accepted commercial practice, the liquid acrylic enamel coating composition is spray applied to a primed substrate, whereafter it is air-dried for a period of about ten minutes, and thereafter baked for a period of about ten minutes at a relatively high temperature, such as 190° F. but below the boiling point of water, in order to effect a volatilization of the residual water content in the coating. The substantially water-free coating thereafter is baked at the final cure temperature for time periods ranging from about 15 minutes to about 30 minutes or longer, to effect a final cure of the coating. In accordance with the practice of the present invention and the unique composition of the acrylic enamel formulation, satisfactory curing of the coating can be effected at a temperature of about 250° F. within a period of about 30 minutes. Temperatures above about 250° F. can also be satisfactorily employed approaching temperatures as high as 300° F. up to about 350° F., which are necessary for effecting a cure of prior art water-reducible type acrylic enamels heretofore known. However, the use of such higher curing temperatures is not necessary and constitutes a wasteful and uneconomical use of fuel and energy.

In order to substantiate the excellent low temperature curing characteristics of the coating formulation of the present invention relative to prior art coating compositions, a special methyl ethyl ketone solvent spot test (MEK spot test) was developed for testing various ostensibly cured acrylic enamel films. In accordance with the procedure of the MEK spot test, a small quantity of methyl ethyl ketone solvent is placed on the film at room temperature and covered with a watch glass to retard its evaporation. After a preselected time period, usually one or two minutes, the MEK solvent is wiped off with a cloth. The degree of cure of the coating is determined by a visual inspection of the extent to which the film is dissolved in the area to which the solvent was applied or was softened or swelled as a result of the solvent contact. An acceptably cured coating is unaffected by the solvent, whereas an unacceptable coating is dissolved or swelled indicating the absence of any cure or of only a partially cured film. In the case of an uncured film, the coating is severely attacked and dissolved by the MEK solvent which comprises a good solvent for both the melamine and acrylic resin constituents of the binder. Partially cured coatings, on the other hand, are swelled and softened to a greater or lesser extent depending upon the degree of cure of the coating.

In addition to the visual subjective evaluation of the films in accordance with the MEK spot test, the magnitude of cure is also evidenced quantitatively by measuring the hardness of the film prior to and one hour after the application of the MEK solvent. By permitting the coating to air dry for a period of one hour after wiping off the MEK solvent, a recovery of the coating is permitted. A decrease in hardness of the coating is inversely related to the extent of its cure. A standard measure of paint film hardness is the Knoop indentation hardness in accordance with the procedure as described in ASTM Method D1474-68.

In order to further illustrate the water-reducible acrylic enamel composition of the present invention, the following examples are provided. It will be understood that the examples are provided for illustrative purposes and are not intended to be restrictive of the scope of the invention as herein described and as set forth in the subjoined claims.

EXAMPLE 1

A flask equipped with condenser and agitator is charged with 500 g n-propanol and 300 g ethylene glycol monobutyl ether and heated to reflux. To this is added over a 120 minute period, a solution of 1420 g butyl methacrylate, 480 g hydroxyethyl methacrylate, 100 g acrylic acid, 100 g methyl ethyl ketone, and 40 g t-butyl peroctoate. The polymer solution is held at reflux for 15 minutes and an additional 100 g methyl ethyl ketone and 2 g t-butyl peroctoate is added. The solution is held at reflux for an additional two hours. The acrylic copolymer has a viscosity of 117,000 cps at 22° C. and an estimated average molecular weight ranging from about 10,000 to about 30,000, and a nonvolatile (NV) content of 66%. The acrylic copolymer has an acid monomer content of 5% and a hydroxy functional monomer content of 24%. The Tg is 32° C.

EXAMPLE 2

A flask equipped with an agitator and condenser is charged with 350 g of ethylene glycol monoethyl ether. The solvent is heated to reflux and a solution of 610 g butyl methacrylate, 100 g styrene, 240 g hydroxyethyl acrylate, 50 g acrylic acid and 8 g t-butyl perbenzoate is added over a 90-minute period. After this addition is completed, the polymer solution is held at reflux for 20 minutes, and an additional 50 g of ethylene glycol monoethyl ether and 2 g of t-butyl perbenzoate is added over a 20-minute period. The polymer solution is then held at reflux for an additional two hours. The resulting polymer solution has a viscosity of 75,000 cps at 25° C., a nonvolatile content of 71% and an acid number of 39 on NV. The calculated Tg is 20° C. The acrylic copolymer has an acid monomer content of 5%, a hydroxy functional monomer content of 24%, and an estimated average molecular weight of about 10,000 to about 30,000.

EXAMPLE 3

A flask equipped with agitator and condenser is charged with 500 g n-propanol and 300 g butanol and heated to reflux. To this is added over a 2½ hour period, a solution of 930 g methyl methacrylate, 640 g butyl acrylate, 360 g hydroxyethyl methacrylate, 70 g acrylic acid, 100 g methyl ethyl ketone, 100 g n-propanol and 51 g t-butyl peroctoate. The polymer solution is held at reflux for an additional 1½ hours. The resin has a viscosity of 70,000 cps at 20° C. and 65% NV. The calculated Tg is 27° C. The acrylic copolymer has an acid monomer content of 3.5%, a hydroxy functional monomer content of 18% and an estimated average molecular weight of about 10,000 to 30,000.

EXAMPLE 4

An acrylic polymer is prepared in accordance with the procedure described in Example 1, except that the monomer composition consists of 1060 g butyl methacrylate, 600 g methyl methacrylate, 240 g hydroxyethyl methacrylate and 100 g acrylic acid. The resin has a viscosity of 75,000 cps at 25° C. and 65.7% NV. The calculated Tg was 40° C. The acrylic copolymer has an acid monomer content of 5%, a hydroxy functional monomer content of 12% and an estimated average molecular weight of about 10,000 to 30,000.

EXAMPLE 5

An aqueous coating composition is prepared by adding 1000 g of ethylene glycol monoethyl ether to a reactor at 128° C. and adding over the next three hours, a composition comprising 541.8 g of hydroxyethyl acrylate, 718.2 g of acrylic acid, 1602 g of styrene, 1003.8 g of 2-ethylhexyl acrylate, 877.8 g of methyl methacrylate, 954 g of butyl methacrylate, 93 g of tertiary dodecyl mercaptan, and 23.4 g of azobisisobutyronitrile. When the above addition is completed, a composition comprising 308 g of ethylene glycol monoethyl ether and 18 g of azobisisobutyronitrile is added over a two-hour period at 145° C. The reaction is continued at 140° C. for an additional 1½ hours and the resin is partially neutralized with 425 g of dimethyl ethanol amine which is added over the next 15 minutes. Over the next 15 minutes, the partially neutralized resin is pre-blended with 1899.2 g of melamine formaldehyde resin (Cymel 303) containing about 1% methylol groups and the reactants are added and then the pre-blended resin is added to 9992 g of deionized water at 75° C. The acrylic copolymer is characterized as having an acid monomer content of 12.6% and a hydroxy functional monomer content of 9.5%. The coating composition is calculated to have a nonvolatile binder content of about 39.5%, with the solvent portion thereof comprising 8.9% organic solvent and the balance water.

EXAMPLE 6

An acrylic polymer is prepared by preliminarily forming a monomer mixture comprising 215 g ethyl acrylate, 215 g methyl methacrylate, 55 g β-hydroxyethyl methacrylate, 15 g methacrylate acid and 108 g 2-ethoxyethanol. To a flask equipped with an agitator and condenser, is charged 1390 g 2-ethoxyethanol which is heated to a temperature of 75° C., whereafter 3.75 g azodiisobutyronitrile is added immediately prior to the addition of ¼ of the monomer mix which is added over a period of about 5 minutes. The reaction mixture is maintained at 75° C.±5° C. during the reaction, and a second quarter of the monomer mix is added over 30 minutes, a third quarter after 60 minutes and a fourth quarter after 90 minutes, with each addition requiring about 5 minutes. The batch temperature is maintained at 75° C. for an additional period of 15 hours, with 1.9 g azodiisobutytronitrile added two hours after the start of the monomer addition, and 0.85 g thereof added two hours later. The batch is thereafter cooled and filtered through cheesecloth to remove insoluble residues.

The 25% concentrate of acrylic polymer in 2-ethoxyethanol is diluted to 12.5% with methanol. A 5-gallon bucket is filled about half-way with equal parts of water and ice, and the mixture is agitated. The polymer solution is slowly added to the agitated ice-water mixture and an immediate precipitate forms. About one gallon of the polymer solution can be precipitated in this way. The ice-water mix is allowed to warm to room temperature, and the precipitated polymer removed by filtration through a Buchner funnel fitted with coarse filter paper.

Two to four successive washings with cold water remove all traces of solvent. The recovered polymer is air-dried.

The recovered and isolated acrylic polymer is solubilized as follows: to a suitable digestion flask is charged 100 g polymer, 400 g water, 25 g tertiary-butanol and 4.6 g dimethylaminoethanol (1.5 equivalents). This mixture is mixed and digested at 70°-80° C. for a period of several hours. The resultant solution is clear and has a viscosity of 50-100 cps at room temperature. The acrylic polymer formed is characterized as having an acid content of about 3%, and a hydroxy functional monomer content of 11%. The calculated Tg is 34° C.

EXAMPLE 7

The pH of a mixture of 420 g paraformaldehyde and 450 g methanol is adjusted to 8.0-8.5 by adding 10% aqueous NaOH. The mixture is heated until the paraformaldehyde dissolves and then 252 g of melamine is added. This is heated to reflux and held for 15 minutes, when 320 g of methanol and 5 cc of 10% aqueous $H_2SO_4$ are added. The reaction mixture is again heated to reflux and held for 50 minutes; then sufficient 10% aqueous NaOH is added to raise the pH above 7. Excess solvent, water and formaldehyde are partially stripped under vacuum and the melamine resin is filtered. The resin has a methylol content of 18% and a nonvolatile content of 88%.

EXAMPLE 8

A melamine resin is prepared as in Example 7 except that after adding melamine, the solution is heated to reflux and held for 30 minutes. At this point, the methanol and acid are added, and the solution brought to reflux and held for 60 minutes before neutralizing with aqueous NaOH. The stripped and filtered resin has a methylol content of 15% and a nonvolatile content of 87%.

EXAMPLE 9

A flask was charged with 420 g paraformaldehyde, 600 g methanol and 3 cc of 10% aqueous NaOH. This is heated to give a clear solution, at which time 252 g of melamine is added, and the mixture heated to reflux and held for 30 minutes. After refluxing 30 minutes, 554 g methanol and 10 cc of 10% aqueous $H_2SO_4$ are added. The mixture is again brought to reflux and held for two hours and 10 minutes, at which point the resin solution (pH 5.2) is neutralized with 10% aqueous NaOH, vacuum stripped and filtered. The final resin solution has a nonvolatile content of 90% and a methylol content of 12%.

EXAMPLE 10

A mixture of 970 g paraformaldehyde, 900 g methanol and 6 cc of 10% aqueous NaOH is heated until clear, whereupon 504 g melamine is added. This is heated to reflux and held for 5 minutes before adding 640 g methanol and 15 cc of 10% aqueous $H_2SO_4$. The acidified solution is held at reflux for 23 minutes, followed by neutralization with 10 cc of 10% aqueous NaOH. The stripped and filtered resin solution has a nonvolatile content of 90%, and a methylol content of 23%.

EXAMPLE 11

The acrylic copolymer of Example 1 is neutralized 70% with dimethylethanolamine and reduced to 28% NV with deionized water. A metallic coating light in color is made as follows:

| | |
|---|---|
| Aluminum flake | 10.0 parts |
| Diethylene glycol monobutyl ether | 12.0 parts |
| Example 7 melamine resin | 86.9 parts |
| Neutralized Example 1 acrylic copolymer | 428.6 parts |
| Deionized water | 138.4 parts |
| | 675.9 parts |

EXAMPLE 12

The acrylic copolymer of Example 2 is neutralized 70% with dimethylethanolamine and reduced to 28% NV with deionized water. A metallic coating light in color is made as follows:

| | |
|---|---|
| Aluminum flake | 10.0 parts |
| Diethylene glycol monobutyl ether | 12.0 parts |
| Example 7 melamine resin | 90.9 parts |
| Neutralized Example 2 acrylic copolymer | 428.6 parts |
| Deionized water | 80.9 parts |
| | 622.4 parts |

EXAMPLE 13

The acrylic copolymer of Example 3 is neutralized 70% with dimethylethanolamine and reduced to 30% NV with deionized water. A metallic coating light in color is made as follows:

| | |
|---|---|
| Aluminum flake | 10.0 parts |
| Diethylene glycol monobutyl ether | 12.0 parts |
| Example 7 melamine resin | 68.2 parts |
| Neutralized Example 3 acrylic copolymer | 466.7 parts |
| Deionized water | 174.5 parts |
| | 731.4 parts |

EXAMPLE 14

The acrylic copolymer of Example 4 is neutralized 70% with dimethylethanolamine and reduced to 30% NV with deionized water. A metallic coating light in color is made as follows:

| | |
|---|---|
| Aluminum flake | 10.0 parts |
| Diethylene glycol monobutyl ether | 12.0 parts |
| Example 7 melamine resin | 45.5 parts |
| Neutralized Example 4 acrylic copolymer | 533.3 parts |
| Deionized water | 200.7 parts |
| | 801.5 parts |

EXAMPLE 15

The acrylic copolymer of Example 1 is neutralized 70% with dimethylethanolamine and reduced to 25% NV with deionized water. A metallic coating light in color is made as follows:

| | |
|---|---|
| Aluminum flake | 10.0 parts |

-continued

| | |
|---|---|
| Diethylene glycol monobutyl ether | 12.0 parts |
| Example 9 melamine resin | 89.0 parts |
| Neutralized Example 1 acrylic copolymer | 480.0 parts |
| Deionized water | 100.4 parts |
| | 691.4 parts |

EXAMPLE 16

The acrylic copolymer of Example 1 is neutralized 70% with dimethylethanolamine and reduced to 25% NV with deionized water. A metallic coating light in color is made as follows:

| | |
|---|---|
| Aluminum flake | 10.0 parts |
| Diethylene glycol monobutyl ether | 12.0 parts |
| Example 10 melamine resin | 88.9 parts |
| Neutralized Example 1 acrylic copolymer | 480.0 parts |
| Deionized water | 67.4 parts |
| | 658.3 parts |

EXAMPLE 17

The acrylic melamine blend of Example 5 is made into a metallic coating light in color as follows:

| | |
|---|---|
| Aluminum flake | 10.0 parts |
| Diethylene glycol monobutyl ether | 12.0 parts |
| Example 5 acrylic-melamine resin | 557.1 parts |
| Deionized water | 63.4 parts |
| | 642.5 parts |

EXAMPLE 18

The acrylic copolymer of Example 6 is made into a coating light in color as follows:

| | |
|---|---|
| Aluminum flake | 5.0 parts |
| Diethylene glycol monobutyl ether | 6.0 parts |
| Example 7 melamine resin | 19.0 parts |
| Example 6 acrylic copolymer | 443.1 parts |
| Deionized water | 27.5 parts |
| | 500.6 parts |

EXAMPLE 19

The acrylic copolymer of Example 6 is made into a metallic coating light in color as follows:

| | |
|---|---|
| Aluminum flake | 5.0 parts |
| Diethylene glycol monobutyl ether | 6.0 parts |
| Methoxy methylol melamine* | 20.9 parts |
| Example 6 acrylic copolymer | 443.1 parts |
| Deionized water | 27.5 parts |
| | 502.5 parts |

*[Rohm & Haas MM 83 melamine] containing 16% methylol groups.

EXAMPLE 20

The acrylic copolymer of Example 6 is made into a metallic coating light in color as follows:

| | |
|---|---|
| Aluminum flake | 5.0 parts |
| Diethylene glycol monobutyl ether | 6.0 parts |
| Example 8 melamine resin | 19.3 parts |
| Example 6 acrylic copolymer | 443.1 parts |
| Deionized water | 41.2 parts |
| | 514.6 parts |

The coating formulations of Examples 11–20 are spray applied on automotive primed and treated substrates. After a 10 minute air-dry, the panels are given a 10 minute flash-off bake at 190° F. and a final cure of 30 minutes at 250° F. After cooling, each of the panels is subjected to a Knoops hardness test, a 2 minute MEK spot test and a second hardness test one hour after the MEK solvent is removed. Results of the cure test for various coating examples are tabulated in Table 1.

TABLE I

CURE EVALUATION - COATINGS EXAMPLES

| Coating Example | Acrylic Polymer Example | % Hydroxyl Monomer | % Acid Monomer | Melamine Resin Example | % Melamine Resin in NV Binder | % Methylol in Melamine Resin | 2-Minute MEK Spot | Tukon Knoops Hardness Before MEK Spot | 1-Hour After MEK Spot |
|---|---|---|---|---|---|---|---|---|---|
| 11 | 1 | 24 HEMA[1] | 5AA[3] | 7 | 40 | 18 | no effect | 17.6 | 18.0 |
| 12 | 2 | 24 HEA[2] | 5AA | 7 | 40 | 18 | no effect | 15.9 | 16.8 |
| 13 | 3 | 18 HEMA | 3.5AA | 7 | 30 | 18 | no effect | 15.6 | 16.2 |
| 14 | 4 | 12 HEMA | 5AA | 7 | 20 | 18 | softened | 14.6 | 12.2 |
| 15 | 1 | 24 HEMA | 5AA | 9 | 40 | 12 | no effect | 16.5 | 18.5 |
| 16 | 1 | 24 HEMA | 5AA | 10 | 40 | 23 | no effect | 17.5 | 19.8 |
| 17 | 5 | 9.5 HEMA | 12.6AA | Cymel 303 | 25 | 1-2 | softened | 6.7 | soft-off scale |
| 18 | 6 | 11 HEMA | 3MAA[4] | 7 | 16.7 | 18 | softened | 17.4 | 15.4 |
| 19 | 6 | 11 HEMA | 3MAA | Rohm & Haas MM-83 | 16.7 | 16 | softened | 18.9 | 7.2 |
| 20 | 6 | 11 HEMA | 3MAA | 8 | 16.7 | 15 | softened | 18.2 | 12.2 |

[1]hydroxy ethyl methacrylate
[2]hydroxy ethyl acrylate
[3]acrylic acid
[4]methacrylic acid It can be seen from Table 1 that Examples 11, 12, 13, 15 and 16, which are formulated within the critical limits of the present invention, all pass the cure test. Example 14, containing 12% hydroxy functional monomer, fails. Example 17, which is typical of high bake systems, fails badly. Examples 18, 19 and 20 also fail. It was noted without explanation that all coating examples which were unaffected by MEK increased in Knoops hardness.

While it will be apparent that the invention herein described is well calculated to achieve the benefits and advantages set forth above, it will be appreciated that the invention is susceptible to modification, variation and change without departing from the spirit thereof.

What is claimed is:

1. A water-reducible acrylic enamel coating composition comprising a substantially uniform mixture of a vehicle comprising a nonvolatile binder and a solvent, said binder comprising:
   (1) about 25% to about 40% of a water miscible partially etherified melamine formaldehyde resin containing from about 10% up to about 30% methylol groups,
   (2) about 60% to about 75% of an acrylic copolymer having a Tg of about $-10°$ C. to about 45° C., a molecular weight of about 2,000 to about 100,000 and comprising the copolymerization product of:
      (a) about 3% to about 8% of an $\alpha, \beta$ unsaturated carboxylic acid selected from the group consisting of acrylic acid, methacrylic acid and mixtures thereof;
      (b) about 10% to about 30% of a hydroxy functional monomer selected from the group consisting of hydroxy $C_2$ to $C_4$ alkylacrylate, hydroxy $C_2$ to $C_4$ alkyl methacrylate and mixtures thereof, and
      (c) about 62% to about 87% of a nonfunctional monomer selected from the group consisting of acrylonitrile, styrene, $C_1$ to $C_{12}$ alkyl acrylates, $C_1$ to $C_{12}$ alkyl methacrylates and mixtures thereof, said acrylic copolymer further characterized as having the carboxyl group thereof substantially neutralized with a tertiary amine solubilizing agent to an extent sufficient to provide a pH of about 7 to about 12 and to impart hydrophilic properties to said copolymer, said solvent comprising a mixture of a water-miscible organic solvent and water, said coating composition characterized as capable of being substantially completely cured at a temperature of about 250° F.

2. The acrylic enamel coating composition as defined in claim 1, in which said melamine formaldehyde resin contains from about 12% to about 25% by weight methylol groups.

3. The acrylic enamel coating composition as defined in claim 1, in which said tertiary amine solubilizing agent contains up to about $C_{10}$.

4. The acrylic enamel coating composition as defined in claim 1, in which said tertiary amine solubilizing agent is selected from the group consisting of tertiary alkyl amines, tertiary dialkyl hydroxyalkyl amines, tertiary monoalkyl dihydroxy alkyl amines, and mixtures thereof.

5. The acrylic enamel coating composition as defined in claim 1, in which said tertiary amine solubilizing agent is selected from the group consisting of dimethyl ethanol amine, diethyl ethanol amine, and mixtures thereof.

6. The acrylic enamel coating composition as defined in claim 1, in which said solvent contains from about 4% to about 20% by volume of said water-miscible organic solvent.

7. The acrylic enamel coating composition as defined in claim 1, in which said water-miscible organic solvent is selected from the group consisting of $C_1$–$C_8$ alkanols, $C_2$–$C_4$ glycol mono- and di-ethers of $C_1$–$C_4$ alcohols, $C_2$–$C_5$ n-ketones, $C_2$–$C_4$ diglycol mono ethers of $C_1$–$C_4$ alcohols, and mixtures thereof.

8. The acrylic enamel coating composition as defined in claim 1, further including up to about 50% by weight of said nonvolatile binder of a particulated pigment.

9. The acrylic enamel coating composition as defined in claim 1, further including a pigment present in an amount of about 2% up to about 43% by weight of said nonvolatile binder constituent.

* * * * *